United States Patent
Gleason et al.

(10) Patent No.: US 10,403,285 B1
(45) Date of Patent: Sep. 3, 2019

(54) METHODS AND APPARATUS TO DEFINE VIRTUAL SCENES USING NATURAL LANGUAGE COMMANDS AND NATURAL GESTURES

(71) Applicant: Google LLC, Mountain View, CA (US)

(72) Inventors: Tim Gleason, Jersey City, NJ (US); Jon Bedard, New York, NY (US); Darwin Yamamoto, Brooklyn, NY (US); Ian MacGillivray, New York, NY (US); Jason Toff, Hoboken, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/831,617

(22) Filed: Dec. 5, 2017

Related U.S. Application Data

(60) Provisional application No. 62/429,994, filed on Dec. 5, 2016.

(51) Int. Cl.
| | | |
|---|---|---|
| *G10L 15/00* | (2013.01) | |
| *G10L 15/26* | (2006.01) | |
| *G06F 17/27* | (2006.01) | |
| *G06F 3/01* | (2006.01) | |

(52) U.S. Cl.
CPC ............ *G10L 15/265* (2013.01); *G06F 3/012* (2013.01); *G06F 3/013* (2013.01); *G06F 3/017* (2013.01); *G06F 17/271* (2013.01)

(58) Field of Classification Search
USPC ......................................................... 345/633
See application file for complete search history.

(56) References Cited

U.S. PATENT DOCUMENTS

| | | | | |
|---|---|---|---|---|
| 6,154,723 | A * | 11/2000 | Cox .................. | G06F 3/011 345/419 |
| 7,373,292 | B1 | 5/2008 | Sproat et al. | |
| 2002/0080193 | A1 * | 6/2002 | Muthusamy ........ | G06F 3/04815 715/848 |
| 2012/0249590 | A1 * | 10/2012 | Maciocci ............. | G06F 3/011 345/633 |
| 2013/0307875 | A1 * | 11/2013 | Anderson ........... | G06T 19/006 345/633 |
| 2017/0228036 | A1 * | 8/2017 | Klein .................. | G06F 3/017 |
| 2018/0004283 | A1 * | 1/2018 | Mathey-Owens .................. G06F 3/04815 | |

* cited by examiner

*Primary Examiner* — Daniel Abebe
(74) *Attorney, Agent, or Firm* — Brake Hughes Bellermann LLP

(57) ABSTRACT

The disclosed methods and apparatus allow a lay person to easily and intuitively define virtual scenes using natural language commands and natural gestures. Natural language commands include statements that a person would naturally (e.g., spontaneously, simply, easily, intuitively, etc.) speak without any or little training. Example natural language commands include "put a cat on the box," or "put a ball in front of the red box." Natural gestures include gestures that a person would naturally do, perform or carry out (e.g., spontaneously, simply, easily, intuitively, etc.) without any or little training. Example natural gestures include pointing, a distance between hands, gazing, head tilt, kicking, etc. The person can simply speak and gesture how it naturally occurs to them.

20 Claims, 6 Drawing Sheets

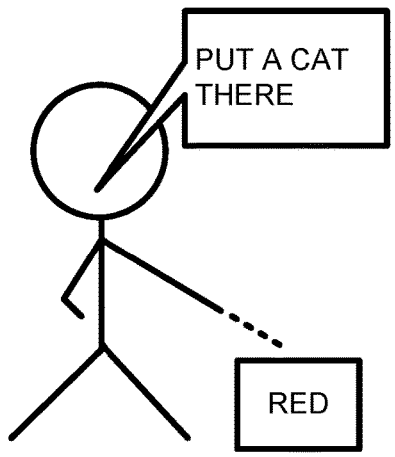
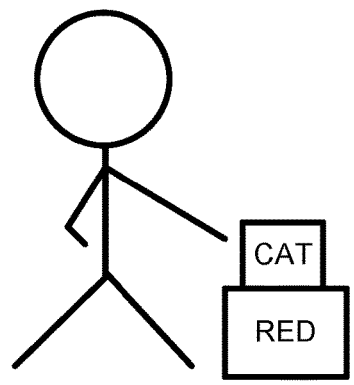
FIG. 2A  FIG. 2B
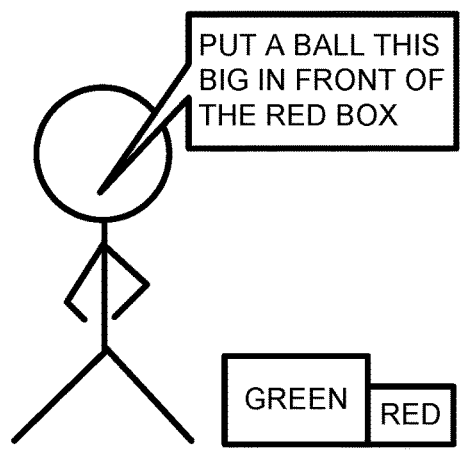
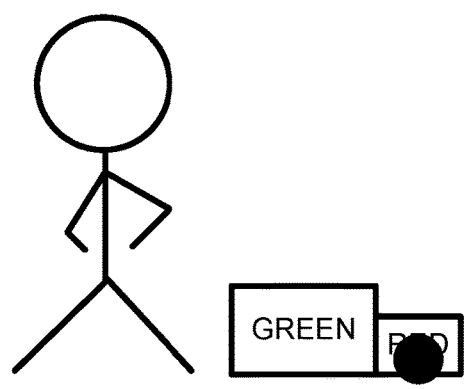
FIG. 3A  FIG. 3B

METHODS AND APPARATUS TO DEFINE VIRTUAL SCENES USING NATURAL LANGUAGE COMMANDS AND NATURAL GESTURES

CROSS-REFERENCE TO RELATED APPLICATION

This application claims priority to, and is a continuation of, U.S. Patent Application No. 62/439,994, filed on Dec. 5, 2016, entitled "METHODS AND APPARATUS TO DEFINE VIRTUAL SCENES USING NATURAL LANGUAGE COMMANDS AND NATURAL GESTURES", the disclosure of which is incorporated by reference herein in its entirety.

SUMMARY

In one general aspect, a method can include translating words spoken by a user while in a scene into text, the scene capable of including a computer-generated virtual element. The method can also include parsing the text into a spoken command fragment. The method can further identifying a scene definition gesture from gesture information captured for the user in the scene. The method can further include combining the spoken command fragment and the scene definition gesture to form a scene building instruction. The method can further include performing the scene building instruction to at least partially define the computer-generated element of the scene The details of one or more implementations are set forth in the accompanying drawings and the description below. Other features will be apparent from the description and drawings, and from the claims.

BRIEF DESCRIPTION OF THE DRAWINGS

FIGS. 2A and 2B illustrate an example natural language command and natural gesture that may be used to define a virtual scene.

FIGS. 3A and 3B illustrate another example natural language command and natural gesture that may be used to define a virtual scene.

DETAILED DESCRIPTION

Figure 1:
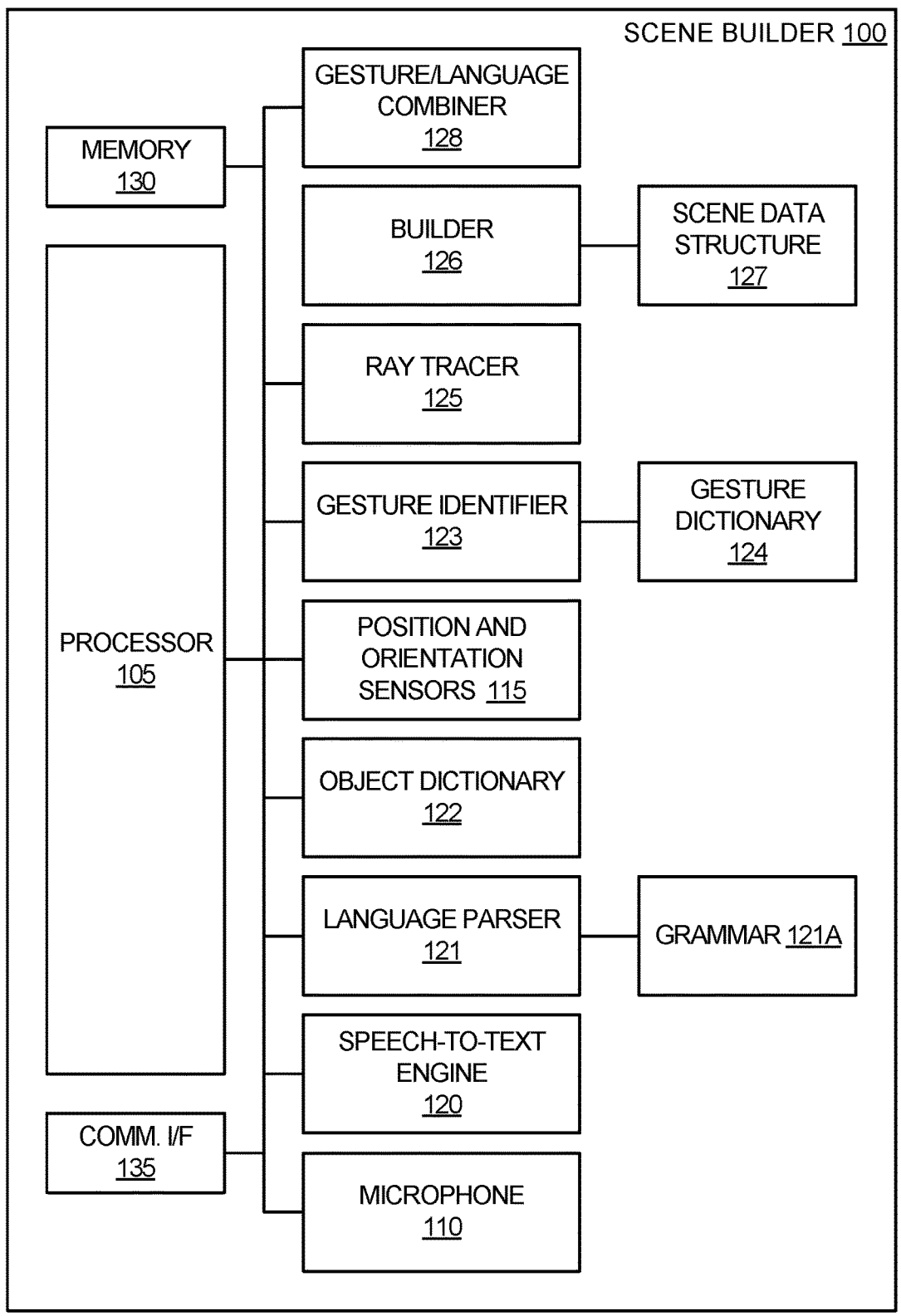
FIG. 1 is a schematic diagram that illustrates an example scene builder in accordance with the teachings of this disclosure.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Traditionally, defining or building virtual reality (VR) and augmented reality (VR) environments, scenes and/or spaces involves complex computer science knowledge, which is well beyond lay persons. Moreover, the ability of persons to define AR and VR environments, scenes and/or spaces using physical or virtual controllers is beyond the practical number of buttons or states available on current controllers. The complexity of defining or building VR and AR environments, scenes and/or spaces may hamper the widespread adoption and use of VR and AR. For example, a company might want to use VR or AR to train its employees. However, existing technologies would require the hiring of one or more persons with computer science skills.

The example methods and apparatus disclosed herein overcome at least these deficiencies of existing solutions. The disclosed methods and apparatus allow a lay person to easily and intuitively define virtual scenes using natural language commands and natural gestures. Natural language commands include statements that a person would naturally (e.g., spontaneously, simply, easily, intuitively, etc.) speak without any or little training. Example natural language commands include "put a cat on the box," or "put a ball in front of the red box." Natural gestures include gestures that a person would naturally do, perform or carry out (e.g., spontaneously, simply, easily, intuitively, etc.) without any or little training. Example natural gestures include pointing, a distance between hands, gazing, head tilt, kicking, etc. The person can simply speak and gesture how it naturally occurs to them. Broadly speaking, AR and VR environments, scenes and/or spaces include at least one computer-generated or virtual element and, thus, are simply referred to herein as virtual spaces for purposes of readability.

FIG. 1 is a schematic diagram of an example scene builder 100 having at least a processor 105, a microphone 110, one or more sensors 115, a plurality of components 120-128, and one or more memories 130. Some or all of the components 120-128, together or in combinations, may be implemented by machine-readable instructions executed by the processor 105. Additionally and/or alternatively, some or all of the components 120-128, together or in combinations, may be implemented separate from the scene builder 100, either locally or remotely via a communication interface 135. For instance, some or all of the at least one processor 105, the microphone 110, the one or more sensors 115, the a plurality of components 120-128, and/or the one or more memories 130 may be implemented by one or more of a head-mounted display (HMD) 710, a computing device 726, 727 and/or 728, a VR content system 730, etc., see FIG. 7.

The example processor 105 of FIG. 1 can be in the form of a microcontroller, a central processing unit (CPU), an application-specific integrated circuit (ASIC), a digital signal processor (DSP), a field-programmable gate array (FPGA), a graphics processing unit (GPU), etc. programmed or configured to execute machine-readable instructions stored in memory 130. The instructions, when executed, carried out, or otherwise performed, cause the processor 105 and/or the components 120-128 to, among other things, receive natural language spoken inputs and natural gestures, and define, build, and/or otherwise create virtual spaces based on those natural inputs. In some examples, more than one processor 105 of the same or different type is included in the scene builder 100. The scene builder 100 may be communicatively coupled to other devices (not shown) via, for example, the communication interface (I/F) 135 that implements communication signals and/or protocols, such as Bluetooth®, Wi-Fi®, universal serial bus (USB), etc. Those other devices may be used to perform one or more of speech-to-text conversion, language parsing, gesture identification, ray tracing, scene building, etc.

To receive spoken input, the scene builder 100 includes and/or is communicatively coupled to the microphone 110. Spoken input is stored or buffered by the processor 105 or an interface component (not shown) in, for example, the memory 130. Periodically or aperiodically (e.g., at a gap in spoken input), a speech-to-text engine 120 converts the spoken input into text. A language parser 121 parses, separates, divides, splits, etc. the translated text into spoken command fragments that can be used to define part of virtual scene. For example, the language parser 121 may parse the natural language phrase "put a cat there" of FIG. 2A into spoken command fragments "put" representing what to do, "cat" as an object, and "there" as representing where to put the cat. In such an example, a nature scene definition gesture (e.g., pointing) can be used to help determine to what the spoken command fragment "there" refers. In another example spoken phrase "put a ball in front of the red box" in FIGS. 3A and 3B, a scene definition gesture may not be needed. In some examples, the speech-to-text engine 120 and the language parser 121 are implemented remotely from the scene builder 110 and/or from a person using the scene builder 110. In such instances, recorded speech may be transmitted via a local area network (LAN) or the Internet to the speech-to-text engine 120, with spoken command fragments returned by the language parser 120 via the LAN or the Internet. Spoken words that have been converted into text can be parsed by the language parser 121 into spoken command fragments accordingly to parts of speech, grammar rules, natural sentence breaks, temporal overlaps of fragments and gestures, etc.

In some examples, the microphone 110 is implemented together with a handheld AR or VR controller 712 (see FIG. 7), included as part of the HMD 710, as a physical microphone implemented elsewhere in a virtual space (e.g., a microphone 720 shown in FIG. 7), etc. In the case of a physical microphone 720 located elsewhere in a physical space, a person may perceive the microphone 720 as a virtual microphone enabled when the person moves their hand close to their mouth. In some examples, a start command, such as "Define Scene," etc. enables the use of spoken phrases and gestures to define a virtual space.

In general, spoken phrases can be parsed into spoken command fragments according to a grammar 121A. The grammar 121A defines commands in the form of words or combinations of words that may be used for defining a virtual scene. Example spoken command fragments of a grammar 121A include, but are not limited to, "put," "place," "add," "remove," "modify," "move," etc. A benefit of using a grammar 121A as opposed to a full dictionary of words is that the scene builder 100 has a smaller universe of words or combinations of words to comprehend and perform. However, the scene builder 100 can implement a full dictionary of words. The grammar 121A may, for example, be stored in the memory 130 and/or a VR content system database 732 (see FIG. 7).

Figure 7:
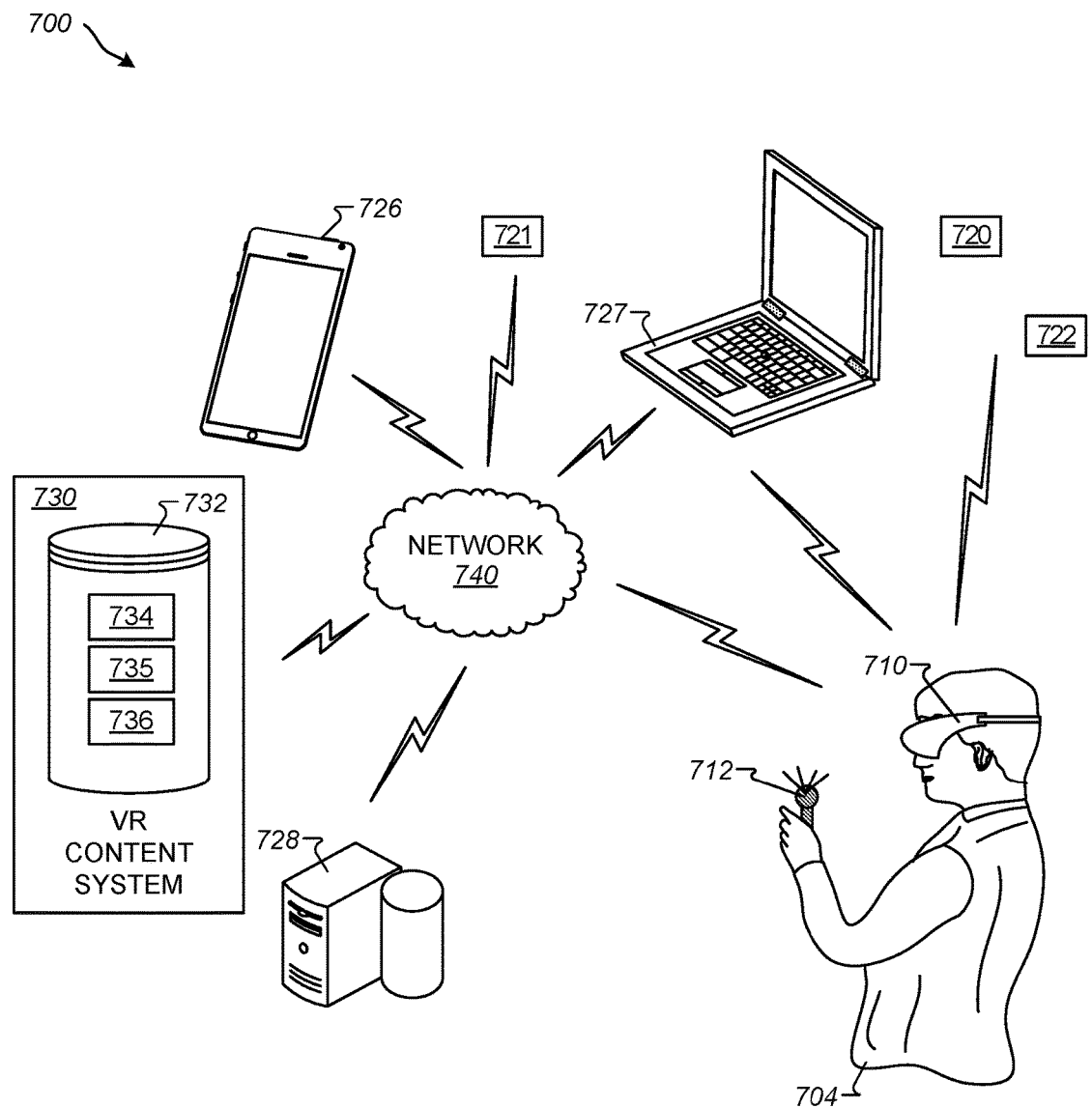
FIG. 7 is a block diagram of an example virtual reality system that may be used to define a virtual scene in accordance with this disclosure.

To identify gestures, the example scene builder 100 includes one or more sensors 115, 721 (see FIGS. 1 and 7). Any number and/or type(s) of sensors 115, 721 in a virtual space may be used. The sensors may be placed at fixed locations in a virtual space, and/or may be worn (e.g., on a head mounted display (HMD)) or held (e.g., on a controller) by a person. The sensors 115, 721 measure gesture information in the form of, for example, the movement, positions, separations, and/or orientations of a person's head, arms and legs.

Gesture information measured by the sensors 115, 721 is stored or buffered by the processor 105 or an interface component (not shown) in, for example, the memory 130. Periodically or aperiodically (e.g., at a gap in spoken input), a gesture identifier 123 identifies scene definition gestures made by a person from the measured gesture information. For example, the gesture identifier 123 can recognize that an arm is pointing because a controller is held at arm's length from the person's head, a size is being indicated by two hands held apart palms facing, a head is facing a particular direction, etc. In some examples, measured gesture information is used to query a gesture dictionary 124 to identify scene definition gestures. Rather than directing their hand or head statically to a single place or object, a more natural interface for a person might be to use scene definition gestures such as pointing, waving a hand, inclining their head, or any other natural motion a user would expect another human to understand outside of virtual reality.

The scene definition gestures stored in the gesture dictionary 124 may be learned via machine learning using test subjects instructed to perform certain gestures so the gesture identifier 123 can learn how measured gesture information correlates with gestures. In some examples, a machine-learned system unique to each type of gesture is used. A large sample of training data comprising persons making pointing gestures at one of many objects can be gathered, together with which objects the people intended to point at, and a system can be trained to recognize which object a person intends to point at with a given gesture. This same approach can be used for inclinations of the head, waving of the arm, and other natural gestures. In some examples, a number of custom configured rules, such as "listen for a large smooth hand movement, and assume the forward-vector orientation at the exact middle of the movement is the one desired," can be implemented. In some examples, the gesture dictionary 124 can be learned using unsupervised learning during actual use. In some examples, the gesture dictionary 124 may be limited to a grammar or set of understood gestures. The gesture dictionary 124 may, for example, stored in the memory 130 and/or the VR content system database 732.

An example ray tracer 125 determines the objects, locations, etc. associated with gestures. For example, the ray tracer 125 can determine to what a point, a stare, a head lean, etc. is directed. The ray tracer 125 can use any number of ray casting or ray tracing methods, techniques, algorithms, etc. to determine objects, locations, etc.

There are many example methods that may be used to track where a user is pointing. In a first example, a ray is cast (in some examples, with a contextually variable radius) coming from a person's hand along a vector, as determined by the orientation of the hand. Objects that this ray collides with can be identified, and whether any of these can aid in understanding the voice command can be determined. For example, if the ray collides with a cat and the command is "make that cat red", the context is clear. An example contextually variable radius is for a subtle pointing motion (e.g., hand moving slowly, by a small amount, etc.) wherein objects within a small radius (e.g., within 1-degree) of the vector the hand is pointing along are considered. Another example is for a larger motion (e.g., a waving hand) wherein objects within a larger radius (e.g., 10-degrees) of the vector the hand is pointing along is considered. Radius may also be varied based on how commands are spoken. For example, "this" in the command "paint this command" may lead to selection of a smaller radius, while "over there" in "paint the cat over there" may imply lead to selection of a larger radius. These could be predetermined or learned rules.

If the ray collides with multiple objects, it can be determined which object is more important to the context. For example, one cat may be closer in distance to the person, or may be more aligned with the vector of the person's hand. In another example, a cat may be within the bounds of the cast ray, but there may be multiple bats that are significantly closer in distance and more aligned, and we may use that to determine that the voice input was likely in error, and instead interpret the phrase as "make that bat red". Some example speech-to-text parsers provide multiple results, with confidence intervals, e.g., the spoken phrase is "make that cat red" with confidence of 0.6; or "make that bat red" with a confidence of 0.3. These confidences could be combined with other information such as "distance to nearest cat" or "distance to nearest bat" to select which phrase to select.

The direction, movement, dwell time, etc. of the gaze (eye or head tracking) can be used similarly to ray casting. The ray tracer 125 traces the rays through a virtual scene as defined in a scene data structure 127. The scene data structure 127 may, for example, stored in the memory 130 and/or the VR content system database 732 (see FIG. 7). In some examples, a scene is represented by a collection of meshes, each occupying some point in 3D space, each with faces and vertices at a certain offset from their mesh-center. A virtual camera is present in the scene, also at a position in 3D space, and a rendering engine is used to determine what the camera can image, and how to draw that to the screen of a HMD (which pixels to turn green, which pixels to turn black, etc.).

A gesture/language combiner 128 combines natural language inputs and natural gestures together to define modifications of a virtual scene. For instance, for the example spoken phrase "put a cat there" of FIG. 2A, the spoken command fragment "there" may not fully specify where the cat is to be placed. However, if the person speaking also points using a scene definition gesture, then the object being pointed at can be used to define where to put the cat.

Figure 4:
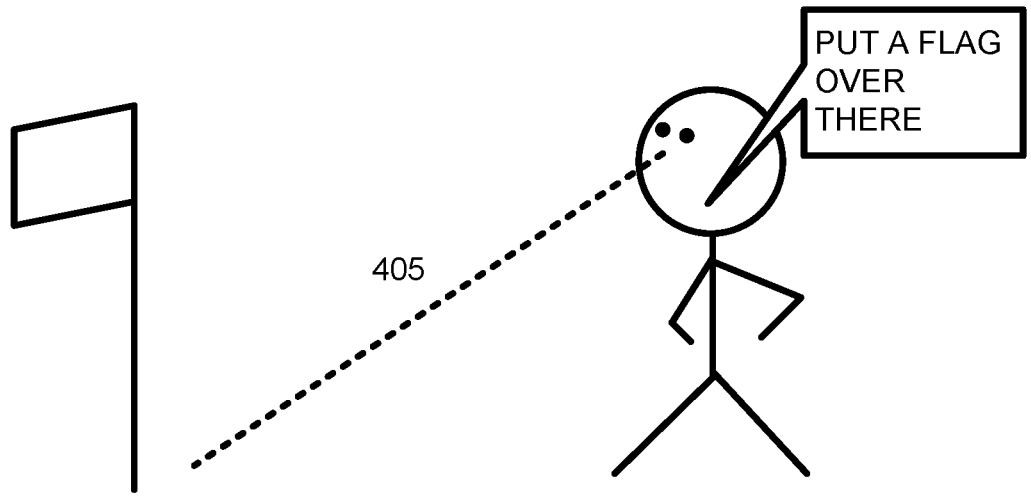
FIG. 4 illustrates still another example natural language command and natural gesture that may be used to define a virtual scene.

For example, if the person points with a scene definition gesture to the top of a red box as also shown in FIG. 2A, then the complete action the person is indicating is "put a cat on top of the red box." By allowing simultaneous naturally spoken command fragments and natural scene definition gestures, a person can more easily, naturally, intuitively, quickly, etc. provide virtual scene change instructions. For example, without the person having to first consciously translate that what they intend as "where" is "on top of the red box" and then speak the entire phrase "put a cat on top of the red box." Having to speak the complete instruction may be more complex and cumbersome than a combination of naturally spoken command fragments and natural scene definition gestures. The gesture/language combiner 128 also works to contextually match or align information received via spoken word and information received via gestures. Again, for the spoken phrase "put a cat there," the combiner 128 could determine to put the cat by the pool rather than in the pool because a person's gaze is likely inaccurate. However, for a fish, the gesture/language combiner 128 could put the fish in the pool. In FIG. 4, a gaze 405 is used instead of a gesture such as a point to place a flag at a location. Likewise, the gesture/language combiner 128 could determine to put the cat on the top of a box rather than on the side of the box to accommodate pointing accuracy. Multiple spoken inputs and gestures may be combined.

For example, a person holding their hands 12 inches apart, pointing their toe out to the side, and speaking "put a cat this big there," can result in a 12 inch long cat placed where their toe is pointing. Size can be used as a search parameter when identifying an object to insert. The hand locations could be determined, for example, by the person holding a tracked controller, wearing some tracked device (e.g., a glove), using an external camera, and/or by detecting hand position with some camera attached to the headset/user.

The gesture/language combiner 128 can accommodate temporal differences between when phrases are spoken and when gestures occur. For instance, for the example spoken phrase "put a cat there," the pointing with the hand may occur slightly after the spoken phrase. For example, a person may take a few moments to decide where to put the cat, there may just a natural pause, etc. In some circumstances, there will additionally and/or alternatively be buffering or processing delays in the recording of speech, the translation of speech, the parsing of text, the buffering of sensor outputs, gesture identification, and/or ray tracing. Some of these delays may arise or be increased when one or more of these functions are performed separately from the scene builder 100 via the communication interface 135. Accordingly, the gesture/language combiner 128 can compare detected gestures with the various fragments of a spoken phrase to find combinations that are logically or contextually related.

The gesture/language combiner 128 combines spoken command fragments and scene definition gestures to form instructions or commands that can be carried out or performed by a builder 126 to build a virtual scene. Various forms of instructions may be used. For the example of the user speaking "put a cat there" while pointing to the top of the red box, the gesture/language combiner 128 can form an example instruction of add(cat, on, red box), where add( ) indicates a new object is to be added, and on might get replaced with another preposition such as in front, behind, beside, etc. Together with existing scene information stored in the scene data structure 127, the builder 126 locates a record or entry 734 for the red box in the scene data structure 127, and adds a new entry 735 to the scene data structure 127 that indicates a cat is now on top of the identified red box. Other example instructions include, but are not limited to, move( ), resize( ), modify( ), etc. In some circumstances, a more generic term is used to identify an object in the scene data structure 127. For example, a red box may be identified in the scene data structure 127 as a red cuboid shape. Spoken command fragments may be compared with sets of rules and, if a fragment matches a set of rules, a predefined command corresponding to the set of rules can be issued, including other parameters obtained from the spoken command. For example, "Make" in "Make the cat red" coupled with the antecedent "the" results in the command Make-Command(cat, red), which changes the color attribute of the cat to red. As scene is already in existence as scene building commands are executed, the commands can immediately modify the scene. They will be stored in the scene data structure 127 for undo/replay etc., but may also be executed immediately upon receipt of a command.

In some examples, the language parser 121 and/or the gesture/language combiner 128 may be trained using machine learning. They may be trained, for example, using test subjects instructed to perform certain scene changes so the language parser 121 and/or the gesture/language combiner 128 can learn the range of inputs that may occur for particular intended outcomes. Alternatively, they can be trained using unsupervised learning during normal use the scene builder 100. Additionally and/or alternatively, rules performed by the language parser 121 and/or the gesture/language combiner 128 may be defined and/or hard coded using a small grammar 121A, and a small gesture dictionary 124. Such hard coding may be sufficient for many anticipated virtual scenes. In some examples, hard coded rules and machine learned rules may be combined.

Figure 5:
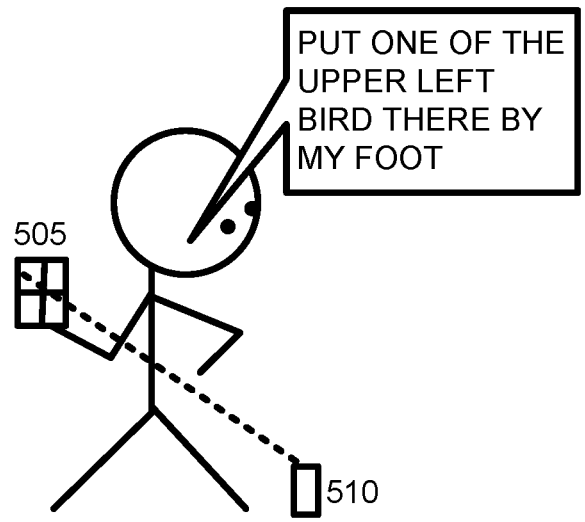
FIG. 5 illustrates yet another example natural language command and natural gesture that may be used to define a virtual scene.

A database of available objects that may be in a virtual scene and selected or identified by a person are stored in an object dictionary 122. The object dictionary 122 stores a data structure storing for each of a plurality of objects one or more characteristics of an object. For example, a breed of cat, a color of the cat, a size of the cat, etc. The characteristics may have default values. As shown in FIG. 5, a virtual handheld menu 505 can used to select an object in addition to spoken words. In FIG. 5, a user has spoken "select bird." Accordingly, the menu 505 showing a plurality of different birds appears. If the user then speaks "put the upper left bird there by my foot," the scene builder 100 selects the upper left bird as the bird 510 to add, uses the gesture of the foot to identify where to place the bird 510, and then adds the selected bird 510 at that place. The object dictionary 122 can include, in some examples, sounds, videos, pictures, etc. The object dictionary 122 may also include aspects of objects, such as, color, texture, pattern, etc. The object dictionary 122 may, for example, be stored in the memory 130 and/or the VR content system database 732.

Figure 6:
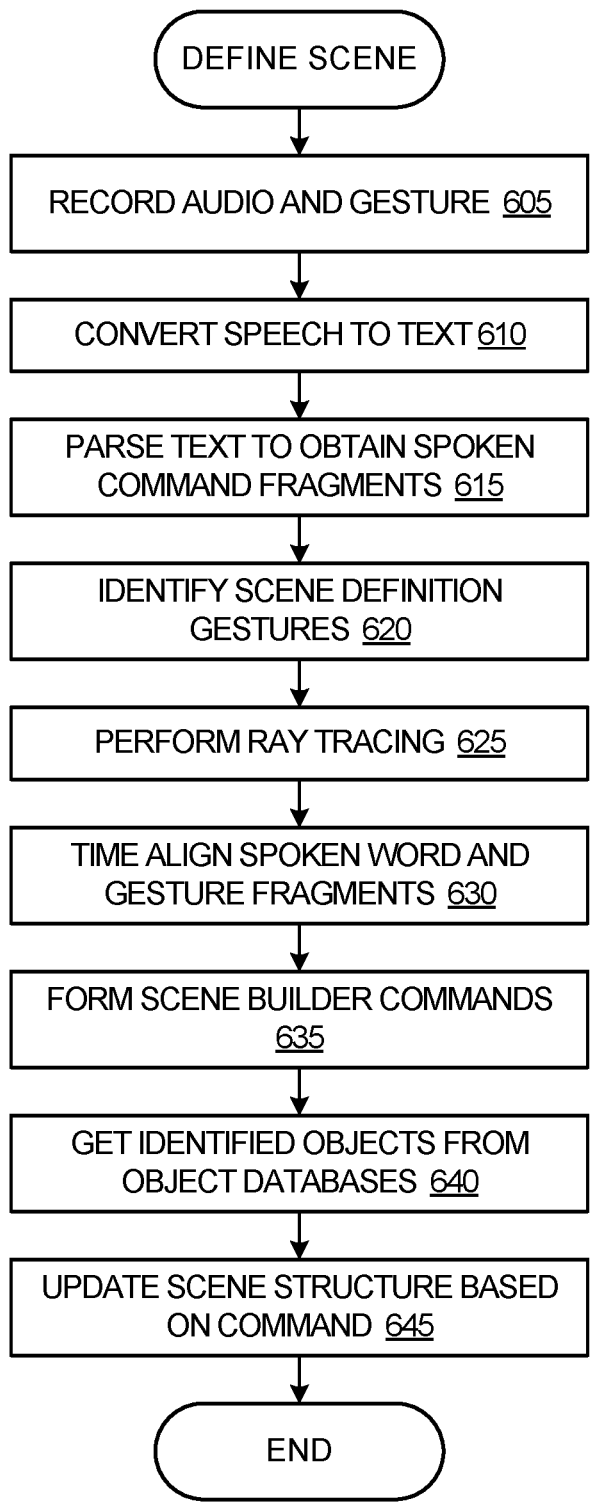
FIG. 6 is a flowchart representing an example method that may be performed to define a virtual scene using natural language commands and natural gestures.
Figure 8:
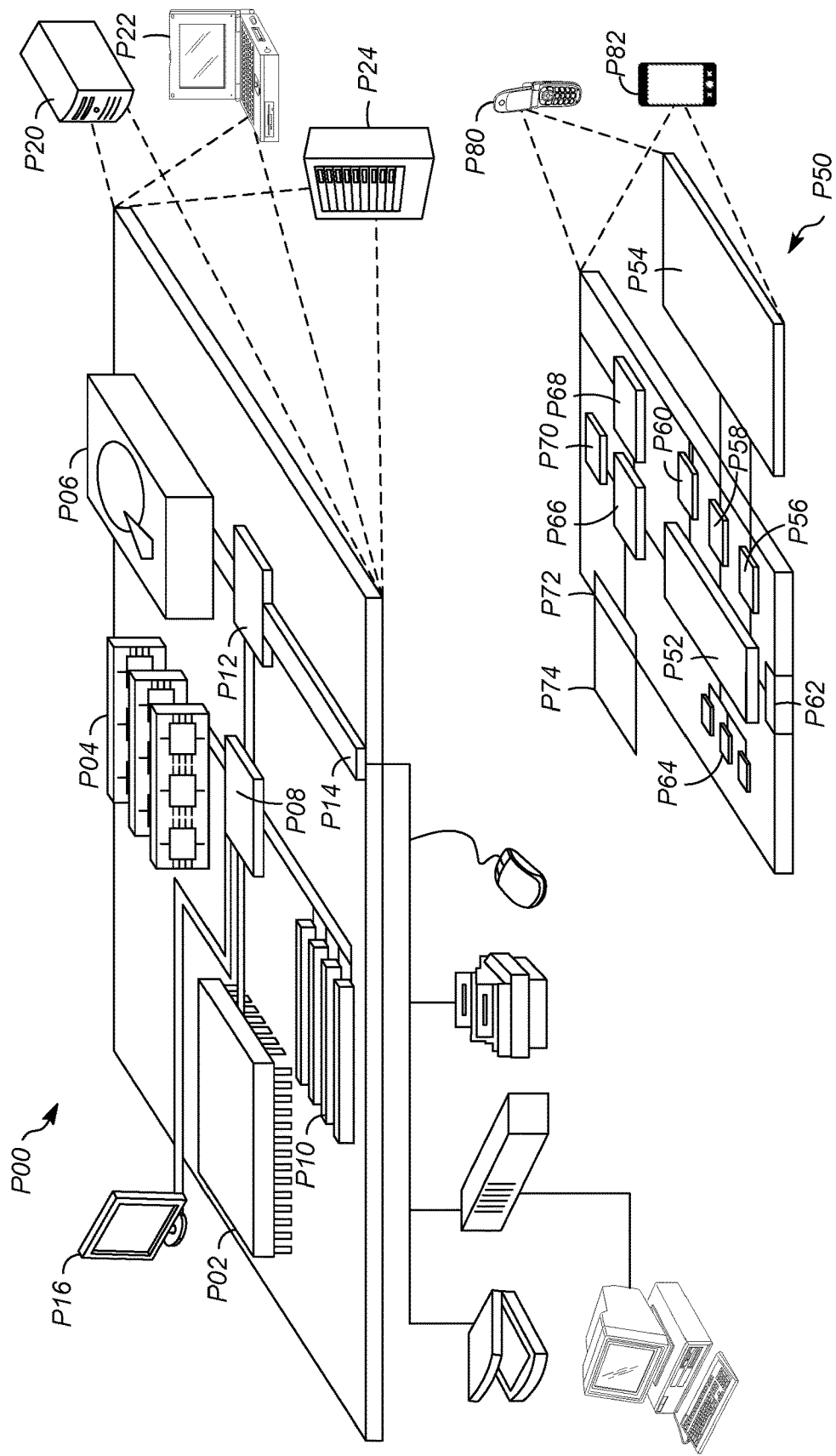
FIG. 8 is a block diagram of an example computer device and an example mobile computer device, which may be used to implement the examples disclosed herein.

FIG. 6 is a flowchart of an example method that may be performed to define a virtual scene based on natural language spoken words and natural gestures. The example method may be implemented by the example scene builder 100 of FIG. 1 and/or as machine-readable instructions performed by one or more processors, such as the example processors 105 (FIG. 1), and P00 and P50 (FIG. 8).

The example method of FIG. 6 includes recording spoken words via the microphone 110, and capturing gesture information via the sensors 115 (block 605). The speech-to-text engine 120 translates the spoken words to text (block 610), and the language parser 121 parses the text into spoken command fragments (block 615).

The gesture identifier 123 queries the gesture dictionary 124 using the captured gesture information to identify scene definition gestures (block 620). The ray tracer 125 performs ray tracing to identify objects or locations based on the identified gestures (block 625).

The gesture/language combiner 128 temporally and/or contextually aligns spoken command fragments with scene definition gestures to identify associated spoken command fragment and gesture pairs (block 630), and forms scene building commands (block 635). The builder 126 identifies the objects associated with the scene building commands from the object dictionary 122 (block 640), and executes the scene building command to update the scene definition data structure (block 645). Control then exits from the example method of FIG. 6.

Turning to FIG. 7, a block diagram of an example VR system 700 is shown. In the example of FIG. 7, a person 704 is wearing a VR head-mounted display (HMD) 710, and holding a VR controller 712. Other persons may be present. The VR system 700 may be used to implement the example scene builder 100 of FIG. 1. The scene builder 100 may, additionally and/or alternatively, be implemented together with or as part of the VR system 700.

The HMD 710 can be used to, among other things, determine the location of the person's head by determining, as a proxy, the location of the HMD 710. Example methods that can be used to determine the location of the person's head include emitters (one of which is designated at reference numeral 722) that can be sensed by the HMD 710, and/or sensors or cameras (one of which is designated at reference numeral 721) that can sense the location of the HMD 710. The HMD 710 can include one or more cameras to sense the emitters 722. Any number and/or type(s) of emitters 722 and sensors/cameras 721, and any method of using the same to determine location of the HMD 710 may be used. Determination of location may be performed by the HMD 710 or another device 726, 727, 728, 730. The HMD 710, or the other devices 726-728 and 730 may be implemented by the example computing devices P00 and P50 of FIG. 8.

The controller 712 can be used to, among other things, determine the location of the person's hand, a held object, a worn object, etc. by determining, as a proxy, the location of the controller 712. Example methods that can be used to determine the location of the controller 712 include the sensors/cameras 721 and the HMD 710 sensing the controller 712. Any number and/or type(s) of sensors/cameras 721, and any method of using the same to determine location of the controller 712 may be used. The controller 712 can emit and/or reflect infrared (IR) light to aid in tracking hand location by IR sensors of the HMD 710, or the sensors/cameras 721. Additionally or alternatively electromagnetic signals and sensors can be used for tracking. Determination of location may be performed by the HMD 710 or another device 726-728, 730.

As shown in FIG. 7, the example VR system 700 includes a plurality of computing and/or electronic devices that can exchange data over a network 740. The devices may represent clients or servers, and can communicate via the network 740 or any other additional and/or alternative network(s). Example client devices include, but are not limited to, a mobile device 726 (e.g., a smartphone, a personal digital assistant, a portable media player, etc.), an electronic tablet, a laptop or netbook 727, a camera, the HMD 710, a desktop computer 728, a gaming device, and any other electronic or computing devices that can communicate using the network 740 or other network(s) with other computing or electronic devices or systems, or that may be used to access VR content or operate within a VR environment. The devices 710 and 726-728 may represent client devices. In some examples, the devices 710 and 726-728 include one or more processors and one or more memory devices, which can execute a client operating system and one or more client applications that can access, control, and light-emitting portion VR content on a light-emitting portion device implemented together with each respective device. One or more of the devices 710, 726-728 and 730 can, e.g., emit or reflect infrared (IR) or other type(s) of light that can be detected by one or more cameras to help determine location of a user or the devices 710, 726-728, 730 for tracking or other VR functions. Additionally or alternatively electromagnetic signals and sensors can be used to tracking.

The example network 740 may be constructed using any number and type(s) of private and/or public networks including, but not limited to, the Internet, a cellular data network, a coaxial cable network, a satellite network, a fiber optic network, a dialup or broadband modem over a telephone network, a Wi-Fi® hotspot, a private communications network (e.g., a private local area network (LAN), a wireless local area network (WLAN), a leased line), etc., and any combination thereof.

The example system 700 of FIG. 7 further includes the VR content system 730. The VR content system 730 may represent a server device. The example VR content system 730 of FIG. 7 includes any number of repositories 732 storing content and/or virtual reality applications 736 that can generate, modify, and execute VR scenes. The repository 732 may be used to store one or more of recorded speech, the grammar 121A, the object dictionary 122, the gesture dictionary 124, and the scene data structure 127.

The example HMD 710 of FIG. 7 may include, for instance, a VR headset, glasses, an eyepiece, or any other wearable device capable of light-emitting portioning VR content. In operation, the HMD 710 can, for example, execute a VR application 736 to playback, present, receive or process images for a user. However, images may be played back, presented and light-emitting portioned by the HMD 710 without need for a VR application 736. In some implementations, a VR application 736 of the HMD 710 is hosted by one or more of the devices 726-728 shown in FIG. 7.

The one or more VR applications 736 of FIG. 7 can be configured to execute on any or all of the devices 710 and 726-728. The HMD 710 can be communicatively coupled to one or more of the devices 726-728 to access VR content stored on or accessible via the VR content system 730. The devices 726-728 can be communicatively coupled (wired and/or wirelessly) to the HMD 710.

The example HMD 710 may be wirelessly coupled to the devices 726-728 via any combination of wireless networks and/or protocols such as, but not limited to, any of the Institute of Electrical and Electronics Engineers (IEEE®) 802.11x family of standards, Wi-Fi®, Bluetooth®, etc.

In the event the HMD 710 is electrically coupled to one or more of the devices 726-728, a cable with an appropriate connector on either end for plugging into the devices 726-728 may be used. For example, the cable can include a Universal Serial Bus (USB) connector on both ends.

In some implementations, the mobile device 726 executes the VR application(s) 736 and provides the content for the VR environment. In some implementations, the laptop computing device 727 executes the VR application(s) 736 and provides content from one or more content servers (e.g., the VR content server 730). In some implementations, the desktop computing device 728 executes the VR application(s) 736 and provides content from one or more content servers (e.g., the VR content server 730). The one or more content servers 730 and one or more computer-readable storage devices 732 can communicate with the mobile device 726, the laptop computing device 727, and/or the desktop computing device 728 using the network 740 to provide content for the HMD 710.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms P00 and P50 discussed below in connection with FIG. 8. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. performed by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the example processor platforms P00 and P50 discussed below in connection with FIG. 8. Machine-readable instructions include, for example, instructions that cause a processor, a computer and/or a machine having a processor to perform one or more particular processes or methods. When a claim of this patent incorporating one or more of the elements of FIG. 1 is read to cover a purely software and/or firmware implementation, at least one of the elements of FIG. 1 is hereby expressly defined to include a tangible article of manufacture such as a tangible machine-readable medium storing machine-readable instructions such as the firmware and/or software.

The example methods disclosed herein may, for example, be implemented as instructions, program code, machine-readable instructions performed by a processor, a computer and/or other machine having a processor. A processor, a controller and/or any other suitable processing device such as those shown in FIG. 8 may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those discussed below in connection with FIG. 8. Many other methods of implementing the example methods may be employed. For example, the order of execution may be changed, and/or one or more of the blocks and/or interactions described may be changed, eliminated, sub-divided, or combined. Additionally, any or the entire example methods may be performed sequentially and/or performed in parallel by, for example, separate processing threads, processors, devices, discrete logic, circuits, etc.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

FIG. 8 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
translating words spoken by a user while in a scene into text, the scene capable of including a computer-generated virtual element;
parsing the text into a spoken command fragment;
identifying a scene definition gesture from gesture information captured for the user in the scene;
performing ray tracing to identify an object or a location based on the identified scene definition gesture;
combining the spoken command fragment and the scene definition gesture to form a scene building instruction; and
performing the scene building instruction to at least partially define the computer-generated element of the scene.

2. The method of claim 1, further comprising time aligning the spoken command fragment and the scene definition gesture.

3. The method of claim 1, further comprising contextually matching the spoken command fragment and the scene definition gesture.

4. The method of claim 1, wherein the scene is modified while the user is in the scene.

5. The method of claim 1, wherein the scene includes a non computer-generated element.

6. The method of claim 1, wherein the computer-generated element comprises an aspect of the computer-generated element.

7. The method of claim 1, wherein the computer-generated element comprises at least one of a 2D object, a 3D object, a sound, a video and/or a picture.

8. The method of claim 1, wherein the gesture of the user includes at least one of pointing, a separation between hands, an eye gaze, and/or a head tilt.

9. The method of claim 1, further comprising:
detecting a spoken start command; and
recording the words spoken by the user after the spoken start command is detected.

10. An apparatus comprising:
a speech-to-text translator to translate words spoken by a user while in a scene into text, the scene capable of including a computer-generated virtual element;
a language parser to parse the text into spoken command fragment;
a gesture identifier configured to identify a scene definition gesture from gesture information captured for the user in the scene;
a ray tracer configured to identify an object or a location based on the identified scene definition gesture;
a gesture/language combiner configured to combine the spoken command fragment and the scene definition gesture to form a scene building instruction; and
a builder configured to perform the scene building instruction to at least partially define the computer-generated element of the scene.

11. The apparatus of claim 10, wherein the gesture/language is configured to time aligning the spoken command fragment and the scene definition gesture.

12. The apparatus of claim 10, wherein the gesture/language is configured to contextually match the spoken command fragment and the scene definition gesture.

13. The apparatus of claim 10, wherein the builder is configured to modify the scene while the user is in the scene.

14. The apparatus of claim 10, wherein the scene includes a non computer-generated element.

15. The apparatus of claim 10, wherein the computer-generated element comprises an aspect of the computer-generated element.

16. The apparatus of claim 10, wherein the computer-generated element comprises at least one of a 2D object, a 3D object, a sound, a video and/or a picture.

17. The apparatus of claim 10, wherein the gesture of the user includes at least one of pointing, a separation between hands, an eye gaze, and/or a head tilt.

18. The apparatus of claim 10, wherein
the speech-to-text engine is configured to detect a spoken start command; and
the words spoken by the user are recorded after the spoken start command is detected.

19. A non-transitory machine-readable media storing machine-readable instructions that, when executed, cause a machine to:
translate words spoken by a user while in a scene into text, the scene capable of including a computer-generated virtual element;
parse the text into a spoken command fragment;
identify a scene definition gesture from gesture information captured for the user in the scene;
perform ray tracing to identify an object or a location based on the identified scene definition gesture;
combine the spoken command fragment and the scene definition gesture to form a scene building instruction; and
perform the scene building instruction to at least partially define the computer-generated element of the scene.

20. The non-transitory machine-readable media of claim 19, wherein the machine-readable instructions, when executed, cause a machine to contextually match the spoken command fragment with the scene definition gesture to form the scene building instruction.

* * * * *